United States Patent [19]
Bastable

[11] Patent Number: 5,315,490
[45] Date of Patent: May 24, 1994

[54] LIGHT FITTINGS

[76] Inventor: Rodney C. Bastable, The Old Court, Newmarket Road, Newmarket Suffolk CB8 8HH, England

[21] Appl. No.: 847,101
[22] PCT Filed: Oct. 12, 1990
[86] PCT No.: PCT/GB90/01579
 § 371 Date: Apr. 9, 1992
 § 102(e) Date: Apr. 9, 1992
[87] PCT Pub. No.: WO91/05972
 PCT Pub. Date: May 2, 1991

[30] Foreign Application Priority Data
Oct. 13, 1989 [GB] United Kingdom ............... 8923122

[51] Int. Cl.$^5$ ............................................. F21V 8/00
[52] U.S. Cl. ................................. 362/32; 367/307
[58] Field of Search .............. 362/32, 256, 307, 147

[56] References Cited

U.S. PATENT DOCUMENTS

| | | | |
|---|---|---|---|
| 3,626,170 | 12/1971 | Schwan | 362/32 |
| 3,666,180 | 5/1972 | Coombs et al. | 362/32 |
| 4,751,617 | 6/1988 | Ryder et al. | 362/32 |
| 4,755,918 | 7/1988 | Pristash et al. | 362/32 |
| 5,021,929 | 6/1991 | Danielian | 362/32 |

FOREIGN PATENT DOCUMENTS

| | | | |
|---|---|---|---|
| 24585 | 4/1906 | United Kingdom | 362/32 |
| 5295 | 1/1907 | United Kingdom | 362/32 |

Primary Examiner—Richard R. Cole
Attorney, Agent, or Firm—Andrus, Sceales, Starke & Sawall

[57] ABSTRACT

A light fitting for a high intensity source has a reflector (10) specifically adapted to give a beam of a predetermined shape. An aperture (16) is provided through the reflector at a zone where a majority of the light from the source and impinging on that zone is reflected back towards the source, and a fibre optic coupler (14) fitted the end of a fibre optic loom (15) is mounted to cooperate with the aperture, to receive light from the source and which would otherwise be reflected back to the source. The projected beam from the fitting is thus hardly affected, and the fibres of the loom can be arranged to provide distracting secondary sources in the vicinity of the fitting.

7 Claims, 3 Drawing Sheets

LIGHT FITTINGS

This invention relates to light fittings and in particular to light fittings adapted to employ high-intensity light sources.

Many lighting situations require high levels of illumination, but at the same time the light sources should not be obtrusive although the illumination itself should be capable of adding to the overall visual effect. For example, in a shop window display, it can be advantageous to use high illumination levels but if the lighting is properly designed, the overall effect of the window display can be much enhanced. This may be achieved by using a number of properly coordinated light sources in conjunction with reflectors especially adapted for use with those sources, whereby each light fitting will project a concentrated beam of known shape. To facilitate the designing of an appropriate form of reflector for this purpose, there have been developed various kinds of relatively high intensity light sources having a relatively small light emitting region—and mention here may be made of so-called HQI TS lamps (halogen/quartz discharge lamps) as well as low-voltage quartz halogen incandescent filament lamps.

A known technique for improving the effect of lighting is to distract the eye from the actual light source, and this may effectively be achieved by disposing a number of low-intensity secondary light sources in the region of, but spaced from, the primary high-intensity source. Such individual low-intensity sources are conveniently produced by fibre optic technology, using a loom of optical fibres the distal ends of which terminate in the required display formation and the proximal ends of which are grouped together within a light box, there being arranged in the light box a high intensity source together with an associated reflector and suitable lenses to direct light on to the proximal ends of the optical fibre. Often a fan has to be provided to maintain the temperature within the box at a suitable level.

The fibre optic technique described above involves considerable installation costs, as well as increased running costs in view of the high-intensity source provided to feed light into the optical fibres, and the fan. Also, it may be necessary to employ a relatively long loom of optical fibres, since the light box often cannot be positioned in the immediate vicinity of the distal ends of the optical fibres. As such, though the technique of distracting the eye from a primary light source by means of a plurality of individual low intensity sources may be desirable, it is used only relatively infrequently on account of the additional complications and costs.

It is a principal aim of the present invention to provide apparatus whereby low intensity secondary light sources may be installed in the vicinity of a high intensity primary source of illumination, whilst overcoming the disadvantages discussed above.

Accordingly, this invention provides a light fitting comprising a holder for a high intensity light source, a reflector specifically adapted for use with a held source and juxtaposed with respect to the holder whereby a held source will provide a beam of a predetermined configuration, there being an orifice formed through the reflector and the light fitting including a fibre optic loom having an end coupler which is mounted to co-operate with the orifice so that light from a held source will be incident on the end face of the coupler to enter the optical fibres of the loom, the orifice being formed through the reflector at a site where a majority of the light from a held source and impinging on that site does not contribute significantly to the resultant beam produced by the reflector.

It will be appreciated that in the light fitting of the present invention, the same high-intensity light source as is used for the primary lighting is also used to provide low intensity distracting lights. Thus, the need for a separate light box together with the attendant equipment and problems of installation are completely obviated and there is no increase in running costs, as compared to the provision of the primary light source itself.

Moreover, though it has previously been assumed that where a high intensity light source is employed in conjunction with a reflector specifically designed for use with that light source to give rise to a beam of a particular pre-determined shape, removal of a section of that reflector is likely to affect the resultant beam to an unacceptable extent—for example by giving rise to a shadow or an area of lesser intensity—it has now surprisingly been established that it is possible to form a relatively large orifice in such a specifically designed reflector without there being too great an influence on the resultant beam. To achieve this, the site at which the orifice is formed in the reflector must carefully be selected; then, almost no interference with the resultant beam will occur. In this invention, the orifice is formed in an area of the reflector where the bulk of the light falling on that area of the reflector may be regarded as 'waste' in that the light does not contribute significantly to the resultant beam. The location of a suitable area of the reflector for the provision of the orifice may be determined empirically, or by analysis having regard to the reflector shape, the nature of the light source and the required resultant beam shape.

For certain designs of reflector, a suitable site for the orifice readily suggests itself. For example, in the case of a reflector intended to provide a simple substantially parallel beam, there will be an area of the reflector generally axially behind the light source (having regard to the direction of projection of the beam) from which area almost no reflected light contributes to the resultant beam. As a consequence, the provision of the orifice at such a 'dead spot' will have essentially no influence on the resultant beam—and yet a fibre optic coupler mounted to co-operate with that orifice will receive a significant amount of illumination from the high intensity source.

By way of further explanation, it is known that a typical light fitting having a high intensity source associated with a high performance reflector specifically adapted for use with that source will project in the principal beam only some 70% of the total light emitted by the source Some of the wasted 30% of light is reflected back into the source itself and this may have the effect of aging the light source faster than would be the case were the light source mounted in free air with no reflector. An appropriate site for the provision of the orifice is one where the amount of light reflected back to the light source is reduced, so that some of the 'waste' light is instead utilised for driving the secondary low intensity light sources provided by the distal ends of the optical fibres in the loom.

The fibre optic coupler may be mounted so as to project through the orifice in the reflector, or may be mounted immediately outside the reflector so that the light falling on the end face of the coupler first passes through the orifice. Another possibility is for the end face of the coupler to be substantially coplanar with the reflector inner surface, in the region immediately surrounding the orifice itself.

The lengths of the optical fibres in the loom may be relatively short as compared to the known installations utilising a separate light box for driving light into the optical fibres, in view of the fact that the light source for the optical fibres may be located relatively close to the required sites for the secondary illumination provided by the optical fibres. The light fitting may be mounted in a panel, such as an insulated ceiling tile, in which case the distal ends of the fibres may be arranged in some suitably attractive pattern in the panel, around and in the general vicinity of the primary light source. If required, coloured lenses, small translucent globes or the like may be mounted at the free ends of the optical fibres, so as to give the required final attractive appearance to the ceiling panel including the light fitting and the secondary sources defined by the optical fibres.

According to a further aspect of this invention, there is provided a method of providing secondary light sources in the vicinity of a light fitting having a holder for a high intensity light source and a reflector specifically adapted for use with a held source to provide a beam of a predetermined configuration, in which method a region of the reflector is identified where a majority of the light from the source and impinging on that region is reflected back to the light source, an orifice is formed in the reflector in said region, the end coupler of a fibre optic loom is positioned to co-operate with the orifice to receive light from the source, and the distal ends of the loom are arranged to provide secondary light sources.

The end face of the fibre optic may be arranged externally of the reflector to receive light passing through the orifice, or the end face may be positioned within or generally co-planar with the reflector. Either way, light which otherwise would have been 'waste' and reflected back to the source is utilised to give use to the secondary sources, from the distal ends of the optical fibres, and the life of the high intensity source may be increased by virtue of less light being reflected back into that source.

The usual impact of the secondary sources may be enhanced by fitting to the distal ends of the optical fibres in the loom lenses, translucent globes or the like. These may be coloured, frosted, multi-faceted or otherwise rendered aesthetically attractive.

By way of example only, certain specific embodiments of this invention will now be described in detail, reference being made to the accompanying drawings in which.

Figure 1:
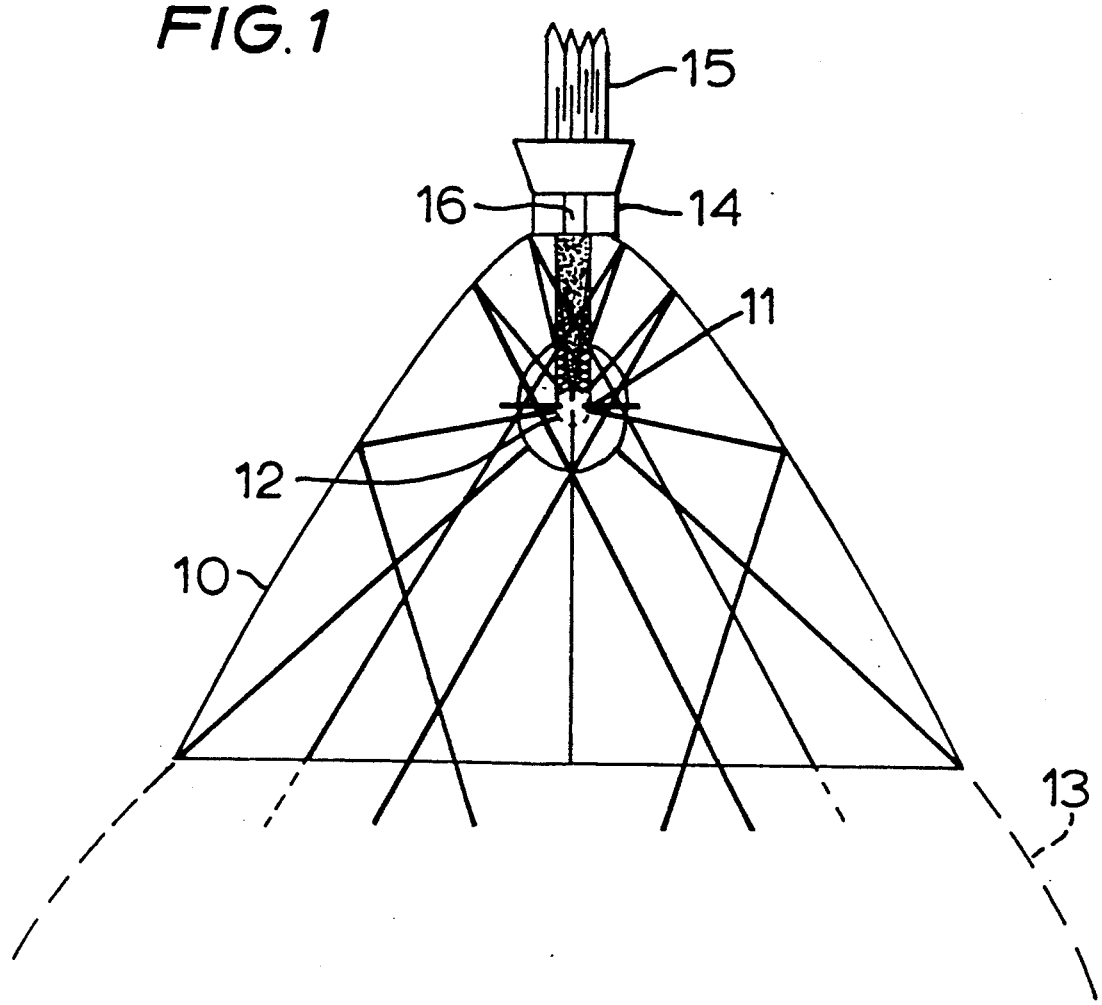
FIG. 1 is a cross-sectional view through a first embodiment of light fitting according to the present invention.
Figure 2:
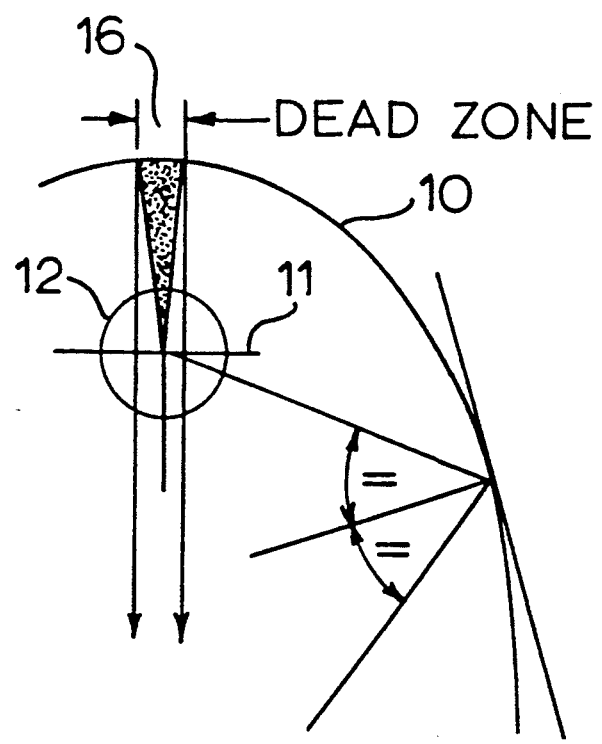
FIG. 2 is a detailed view on a part of the light fitting shown in FIG. 1, illustrating the 'dead zone'.

Referring initially to FIGS. 1 and 2, there is shown a light fitting of this invention, which fitting comprises a reflector 10 and a lamp holder 11 adapted to support a HQI TS discharge lamp bulb. Such a bulb can be regarded as a point-source and the reflector 10 is especially configured for use with the bulb 12 to produce a beam (shown in part at 13) of a predetermined shape. The design criteria for such a reflector 10 in combination with a bulb 12 are well known and understood in the art and will not be described in detail here.

With a reflector and bulb combination as described above and illustrated in FIG. 1, there is a 'dead zone' on the reflector, from which zone light from the bulb 12 will not be reflected to contribute substantially to the beam 13: instead, light reflected from that dead zone may be regarded as waste and will mostly be reflected back into the bulb 12. Such light has a deleterious effect on the bulb 12 and serves to increase the temperature within the bulb envelope, so increasing the aging of the bulb. This dead zone is further illustrated in FIG. 2.

Also illustrated in FIG. 1 is a fibre optic coupler 14 which clamps together a bundle 15 of individual optical fibres. The end faces of those individual fibres are ground flat so as to lie in a common end plane with that of the coupler 14. A lens may be provided in front of the ground end faces of the fibres, for certain applications.

A generally circular aperture 16 is provided in the reflector, to encompass in the dead zone as described above. The coupler 14 is mounted on the reflector such that the ground end faces of the fibres are exposed to the bulb 12 through the aperture 16, as illustrated in FIG. 1. When so mounted, the waste light from the bulb 12, which would have been reflected back into the bulb 12, no longer is so reflected but instead enters the optical fibres of the bundle 15, held by the coupler 14. From there, the light is reflected along the optical fibres to issue from the distal ends thereof. Those distal ends may be arranged as required to provide an attractive display of secondary light sources, and appropriate lenses, translucent globes or the like may be associated with each distal end to enhance the display. Such lenses, globes or the like may be coloured, if appropriate.

Experience shows that sufficient light will enter the fibres to provide adequate secondary lighting, when the coupler is mounted as described above. Typically, in a carefully designed light fitting having a bulb 12 and co-operating reflector 10, some 30% of the light leaving the bulb 12 is wasted and does not contribute to the beam 13; by carefully siting and dimensioning the aperture 16, as much as 50% of that wasted light may be utilised to drive the secondary light sources.

Figure 3:
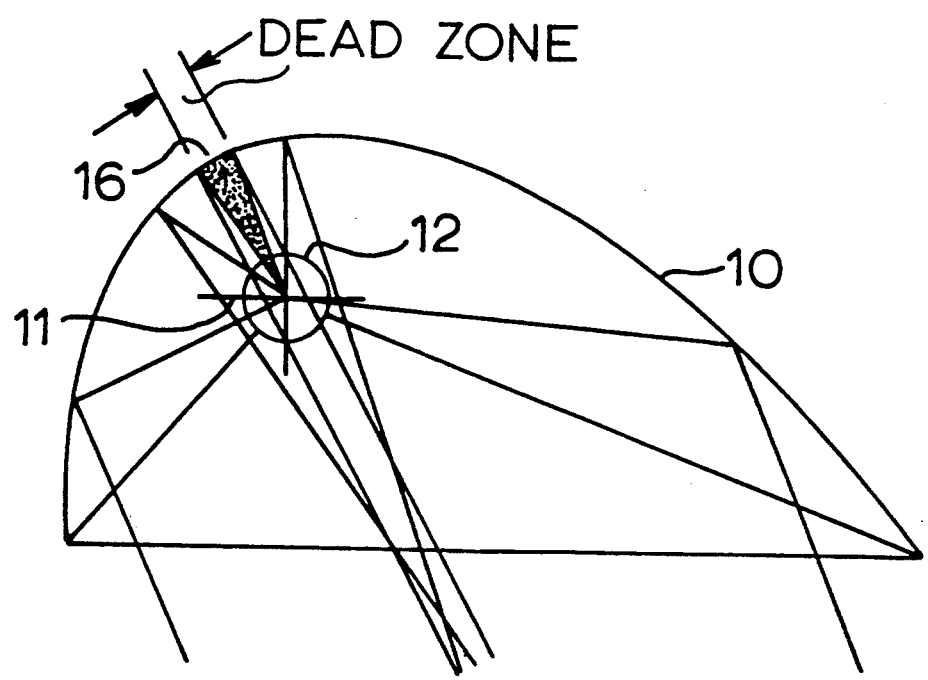
FIG. 3 is a vertical sectional view through a second embodiment of light fitting, showing the region for fitment of a fibre optic coupler.

FIG. 3 shows an asymmetric reflector specifically designed for use with a bulb similar to that shown in FIG. 1, again to provide a beam of a pre-determined shape. With such a reflector, there is a dead zone as with the arrangement of FIG. 1 but the dead zone is disposed asymmetrically with respect to the reflector. Despite this, the aperture 16 should be provided at that dead zone, and a coupler 14 similar to that described with reference to FIG. 1 may then be mounted to receive light passing through the aperture. The light incident on the coupler will then enter the optical fibres to provide the secondary illumination, without there being any significant effect on the main beam.

Figure 4:
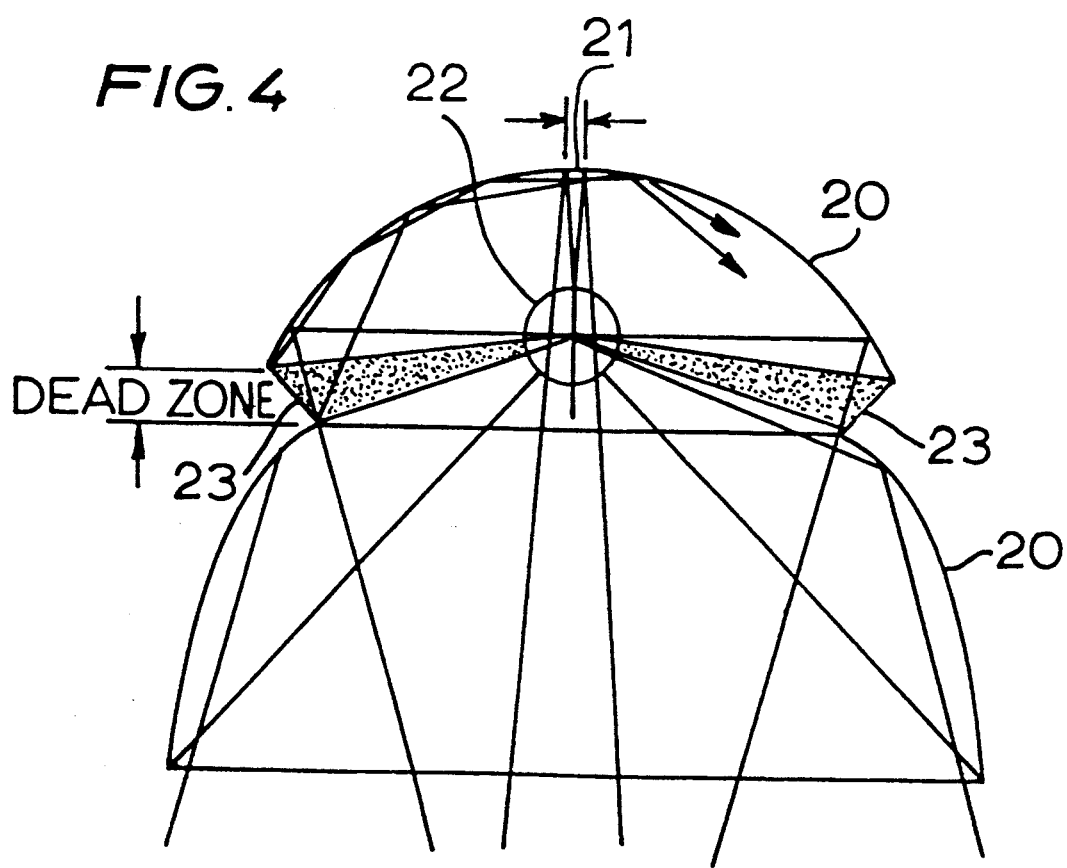
FIGS. 4 and 5 are further sectional views through two further embodiments of light fitting of this invention.

FIG. 4 illustrates a more complex reflector 20 specifically designed to provide a beam of a closely controlled shape. With such a reflector, there is a relatively small dead zone 21 behind the bulb 22. If an aperture large enough to allow a coupler to be mounted there be provided at that dead zone 21, there would be a deleterious effect on the primary beam projected by the light fitting. As a consequence, a site for the aperture and coupler is chosen where the efficiency of the reflector is relatively low (i.e. where much of the incident light does not significantly contribute to the projected beam)—and in the example of FIG. 4, the aperture may be formed at some point on the circumferential region of the reflector, indicated by reference numeral 23. For this particular arrangement, a number of such apertures may be provided around that circumferential region, each aperture having associated therewith a coupler and the associated fibre optic loom, so increasing the number of secondary light sources which may be driven by the one light fitting.

Figure 5:
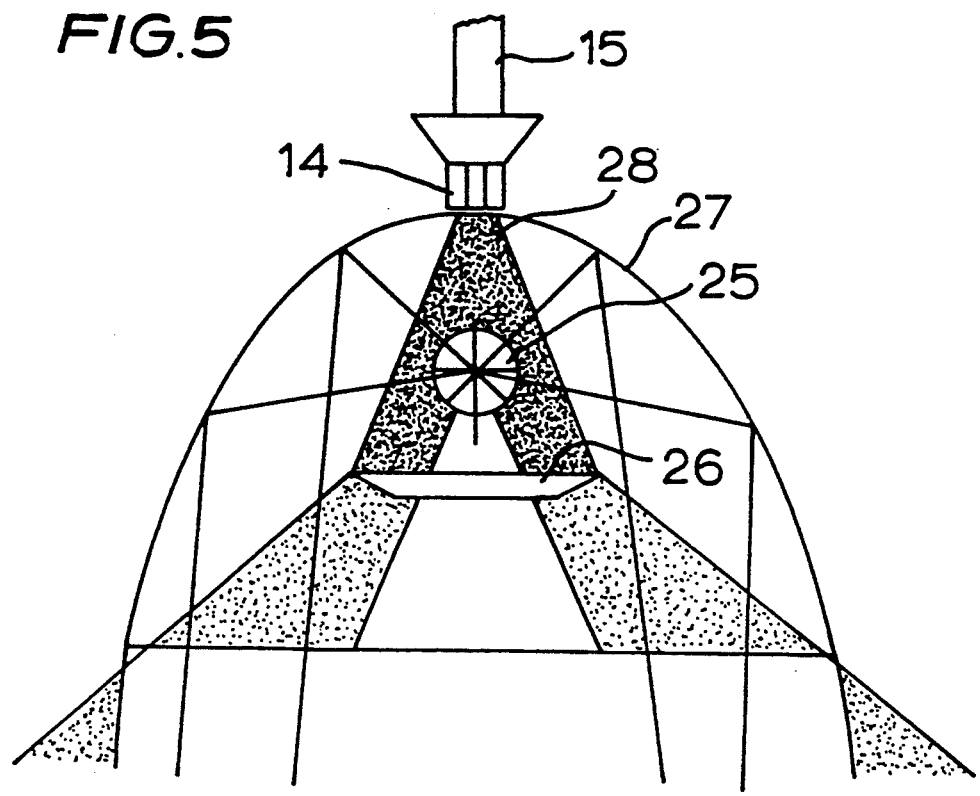

FIG. 5 illustrates a further form of light fitting having a high intensity bulb 25 and a reflecting baffle 26 disposed in front of that bulb, in conjunction with a reflector 27 adapted to provide a narrow beam for use as a spotlight or in downlighting situations. With this arrangement, there is a significant dead area 28 behind the bulb 25, light being incident on that dead area both directly from the bulb 25 itself but also by reflection from the baffle 26. As shown an aperture is formed in the reflector at that dead area and a fibre optic coupler is mounted so that the light passes through the aperture to fall on the end plane of the coupler. From there, the light is reflected along the optical fibres to issue from the optical fibre distal ends, arranged as required around the reflector.

Figure 6:
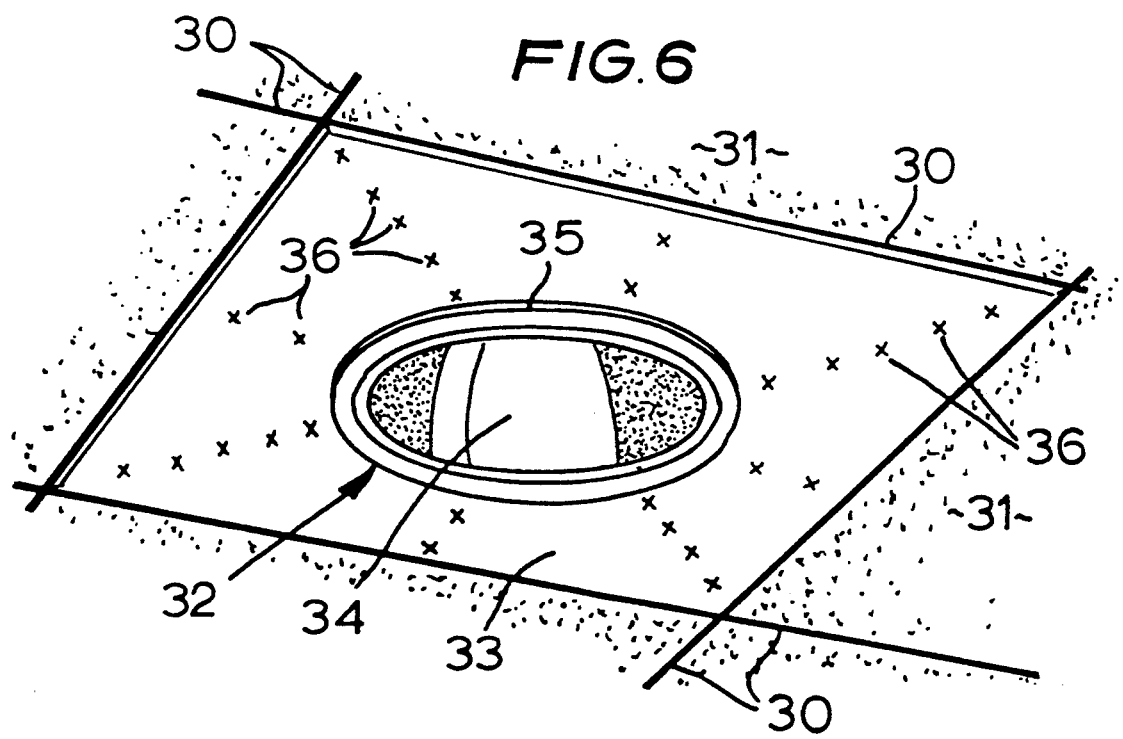
FIG. 6 illustrates a ceiling light fitting of this invention, including secondary sources.

FIG. 6 shows a part of a suspended ceiling including rails 30 supporting ceiling tiles 31. A light fitting 32 of this invention is mounted in one of those ceiling tiles 33, the light fitting including a circular parabolic reflector 34 having an edge trim 35 joining the reflector 34 to the ceiling tile. The fibre optic loom (not shown) has its end coupler arranged with respect to the reflector as illustrated in FIG. 1 and the distal ends of the fibres in the loom project through small openings in the ceiling tile each of which is fitted with a coloured lens 36. If required, more than one fibre may provide light to a given lens, to increase the intensity of the secondary source.

I claim:

1. A light fitting for display illumination to provide a primary light source and at least one secondary light source, comprising a holder for a high intensity light source and a reflector specifically adapted for use with a held source and juxtaposed with respect to the holder whereby a held source will provide a beam of a predetermined configuration, there being an orifice formed through the reflector and the light fitting includes a fibre optic loom having a plurality of optic fibres and having an end coupler which is mounted to cooperate with the orifice so that light from a held source will be incident on the end face of the coupler to enter the optical fibers of the loom. characterized in that the orifice is formed through the reflector at a site where a majority of the light from a held source and impinging on that site does not contribute significantly to the resultant beam produced by the reflector, and wherein distal ends of some of the optical fibres of the loom are provided with lenses, small translucent globes or the like.

2. A light fitting according to claim 1, characterised in that the orifice is provided at a site in the reflector where a majority of light from a held source impinging on that site is reflected back to said source.

3. A light fitting according to claim 2, characterised in that the orifice is provided at the rear of the reflector, behind the source.

4. A light fitting according to claim 1, characterised in that the fibre optic coupler is mounted at a position selected from:
a) a position where the coupler projects through the orifice in the reflector, to collect light from within the reflector;
b) a position where the coupler is outside the reflector, to receive light which first passes through the orifice; and
c) a position where the end face of the fibre optic coupler is substantially co-planar with the reflector inner surface, in the region immediately surrounding the orifice.

5. A method of providing secondary light sources in the vicinity of a light fitting having a holder for a high intensity light source and a reflector specifically adapted for use with a held source to provide a beam of a predetermined configuration, characterised in that a region of the reflector is identified where a majority of the light from the source and impinging on that region is reflected back to the light source, an orifice is formed in the reflector in said region, the end coupler of a fibre optic loom having a plurality of optical fibres is positioned to co-operate with the orifice to receive light from the source, and the distal ends of the optical fibres in the loom are arranged to provide secondary light sources, and wherein distal ends of some of the optical fibres of the loom are provided with lenses, small translucent globes or the like.

6. A method according to claim 5, characterised in that the end face of the fibre optic coupler is arranged externally of the reflector to receive light passing through the orifice.

7. A method according to claim 5, characterised in that the end face of the fibre optic coupler is arranged within or generally co-planar with the reflector.

* * * * *